Figure 1:
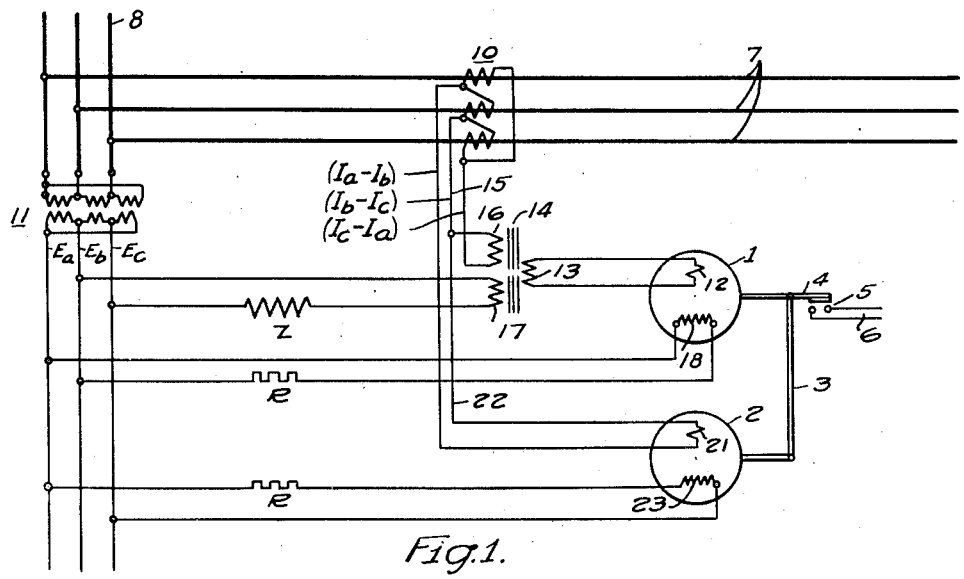

March 21, 1950     A. C. MEHRING     2,501,346

THREE-PHASE PRODUCT-RESPONSIVE RELAY

Filed July 20, 1945

WITNESSES:

INVENTOR
Arthur C. Mehring.
BY
ATTORNEY

UNITED STATES PATENT OFFICE 2,501,346

THREE-PHASE PRODUCT-RESPONSIVE RELAY

Arthur C. Mehring, East Orange, N. J., assignor to Westinghouse Electric Corporation, East Pittsburgh, Pa., a corporation of Pennsylvania Application July 20, 1945, Serial No. 606,091

18 Claims. (Cl. 175—294)

My invention relates to three-phase product-responsive means, and it has particular relation to three-phase directional protective relays, either with or without voltage-restraint.

An object of my invention is to obtain a three-phase product-response, that is, a response to the sum of the products of selected pairs of phases of two sets of three-phase energizing-quantities, and to do this by the algebraic addition of the torques of only two single-phase product-responsive relay elements or parts, each having two flux-producing parts, utilizing certain special diverse vectorial combinations in the energization of the two flux-producing parts of the respective relay-elements, at least some of the four flux-producing parts being energized from a plurality of phases of its corresponding set of three-phase energizing-quantities, so as to bring about this result, as will be subsequently described.

An important field of application for my invention is in the use of two single-phase torque-producing elements of a type which has substantially no double-frequency torque, for obtaining a three-phase torque-response having no double-frequency torque-component. My invention, however, may utilize any available type of product-responsive single-phase element.

The particular nature of my invention, and other objects and advantages thereof, will be apparent from the following description and claims, when read in the light of the accompanying drawing, wherein the two figures are diagrammatic views of circuits and apparatus embodying my invention in two different illustrative forms of embodiment, the single-phase product-responsive elements being symbolically represented.

Let two sets of three-phase electrical quantities, either currents or voltages, be represented by A, B, C, and a, b, c, respectively, said quantities having the same frequency and having any phase-angle and any magnitude-ratio between the principal phases A and a. Let us further assume that at least one of the three-phase quantities, such as A, B, C, has no zero-sequence component, so that $$A+B+C=0 \qquad (1)$$

According to my invention, a three-phase product-type response may be obtained by the algebraic sum of the torques of two single-phase product-type or wattmetric elements 1 and 2, the total torque of which is equal to $$T=K(aB+bC+cA) \qquad (2)$$

There are several ways of obtaining this result. The simplest is to make one of the product-type elements respond to the product of $(b-a)$ and C, times a function of the phase-angle between the multiplier and the multiplicand, while the other element responds to the product of $(c-a)$ and A, times the same function of the phase-angle between the multiplier and the multiplicand. In another case, the products may be, respectively, the product of $(a-b)$ and $(B-C)$, and the product of $(2c-a-b)$ and A.

In the first case, the total torque may be written as the real part of the equation, $$\begin{aligned} T &= (b-a)C+(c-a)A \\ &= -a(A+C)+bC+cA \\ &= aB+bC+cA \end{aligned} \qquad (3)$$

the last line being obtained by substituting $(A+C)=-B$, from Equation 1.

In the second case, the total torque may be written as the real part of the equation, $$\begin{aligned} T &= (a-b)(B-C)+(2c-a-b)A \\ &= aB-aC-bB+bC+2cA-aA-bA \\ &= a(B-C-A)+b(-B+C-A)+2cA \\ &= 2aB+2bC+2cA \end{aligned} \qquad (4)$$

the last line being obtained by substitution from Equation 1.

In Equations 2, 3 and 4, the quantities $a$, B, $b$, C, $c$ and A are vector-quantities.

An illustrative application of these principles involves a three-phase directional relay. For example, the three-phase quantity $a$, $b$, $c$ may represent line-currents $I_a$, $I_b$, $I_c$, and the other three-phase quantity A, B, C may represent either delta or star line-voltages, either with or without the interposition of a phase-shifter. Any one of the voltage-phases, $E_a$, $E_b$, $E_c$, $E_{ab}$, $E_{bc}$, or $E_{ca}$, may be taken as the principal phase A, depending upon the relay-characteristics desired. For example, if the 90° connection is utilized, the delta-voltage $E_{ab}$ would be used as A, and the delta-voltages $E_{bc}$ and $E_{ca}$ as B and C, respectively. To make the case general, a resistance or other impedance R may be regarded as being inserted in series with each of the voltage-sources $E_{ab}$, $E_{bc}$ and $E_{ca}$, to control both the coefficient, which may be called R, and the phase-shift angle $r$, of the voltage-responsive relay-currents, as shown in the drawing. With such excitation, as applied, for example, to Equation 3, the relay-response will be the real part of the equation, $$\begin{aligned} T &= (I_b-I_a) \cdot RE_{ca}e^{jr}+(I_c-I_a) \cdot RE_{ab}e^{jr} \\ &= R(I_aE_{bc}e^{jr}+I_bE_{ca}e^{jr}+I_cE_{ab}e^{jr}) \end{aligned} \qquad (5)$$

The product-type or wattmetric elements may be either cosine-elements, responding to the products of the fluxes times the cosine of the angle between them, or sine-elements, with a sine response, or they may be product-type elements having any other characteristic response-angle. In many cases, particularly in high-speed relay-applications, it is highly desirable that the two single-phase torque-producing elements shall be of a type producing no double-frequency torque-components, several types of such single-phase product-type elements being known, as shown, for example, in the application of W. K. Sonnemann, S. L. Goldsborough and myself, Serial No. 516,238, filed December 30, 1943, patented July 10, 1945, No. 2,380,197. The two single-phase product-type elements may be caused to add (or subtract) their torques in any manner, as by being mounted on the same shaft, or by having two circumferentially displaced stator-members acting on a common rotor-member, or, as symbolically indicated in the drawing, by being linked together by any means such as a connecting rod 3.

The two three-phase quantities $a$, $b$, $c$ and A, B, C may both be current-responsive, or both voltage-responsive, or one or both may have mixed responses to the vectorial sums of currents and voltages.

Thus, as shown in Fig. 1, a three-phase directional relay with voltage-restraint may be provided by two mechanically coupled single-phase product-type or wattmetric elements 1 and 2, the movable arms, 4, of which are coupled together by a connecting-rod 3 or any equivalent torque-combining means. The relay-contacts 5 control any relay-circuit 6. The relay is utilized in connection with a three-phase line 7, which is connected to a three-phase bus 8. Delta-connected line-current transformers 10 derive the line-currents $(I_a-I_b)$, $(I_b-I_c)$ and $(I_c-I_a)$ as marked. Delta-delta voltage-transformers 11 derive the line-voltages $E_a$, $E_b$ and $E_c$, from which any zero-sequence component has been removed by the delta-connection.

In Fig. 1, by adding voltage-restraint BC to Equation 3, the product-type element 1 has a first flux-producing part which is shown as a current-coil 12, which is energized in response to $[(I_c-I_a) - ZE_{bc}e^{jz}]$ in accordance with the output of the secondary winding 13 of a mixing-transformer or reactance 14, or by any other suitable means. The mixing-transformer 14 has two primary windings 16 and 17, the first of which is energized with the differential line-current $(I_c-I_a)$, as supplied by the line-current transformers 10, while the second winding is energized with a voltage-responsive current $ZE_{cb}e^{jz}$ which is obtained from the phases $E_c$ and $E_b$ of the potential-transformers 11, with a serially connected impedance Z.

The product-type element 1 in Fig. 1 is provided with a second flux-producing part which is shown as a voltage-coil 18, so as to provide the excitation $RE_{ab}e^{jr}$, obtained from the phases $E_a$ and $E_b$ of the potential-transformers 11, with a serially connected impedance R.

The other product-type element, 2, in Fig. 1, has a first flux-producing part which is shown as a current-coil 21, which is energized with the current $(I_b-I_a)$, supplied from the line-current transformers 10. The three current-energized circuits 21, 16 and 15 are connected in star, with the star-point connection indicated at 22.

The second product-type element 2 in Fig. 1 is also provided with a second flux-producing part which is shown as a voltage-coil 23, to provide an excitation in response to $RE_{ca}e^{jr}$. Thus, the coil 23 is energized from the phases $E_a$ and $E_c$ of the potential-transformers 11, through a serially connected impedance R.

The resultant torque of the two single-phase product-type torque-producing elements 1 and 2 in Fig. 1 is the real part of the equation, $$T = [(I_c-I_a) - ZE_{bc}e^{jz}].RE_{ab}e^{jr} + (I_b-I_a).RE_{ca}e^{jr}$$
$$= R(I_aE_{bc}e^{jr} + I_bE_{ca}e^{jr} + I_cE_{ab}e^{jr}) - RZE_{ab}E_{bc}e^{j(r-z)} \quad (6)$$

This is the equation for a directional wattmetric response, with the 90° connection, with voltage-restraint $E_{ab}E_{bc}$.

It will be understood that many different combinations of the several phases of the two three-phase sources of voltages and currents could be used to energize or excite the two pairs of flux-producing parts 12, 18 and 21, 23, respectively, of the two product-responsive elements 1 and 2, choosing the excitation so that at least some of the voltage-responsive parts 18 and 23, or at least some of the current-responsive parts 12 and 21, or at least some of both of these kinds of parts, are energized from a plurality of phases of their associated three-phase energizing-voltages or -currents, as the case may be, the combination of energizing-phases which are chosen for the two flux-producing parts, 12 and 18, of one element, 1, being different from the combination of energizing-phases which are chosen for the two flux-producing parts, 21 and 23, of the other element, 2, and these diverse combinations of energizing-phases being so chosen that the unwanted terms, $aA$, $aC$, $bA$, $bB$, $cB$ and $cC$, of the multiplication cancel out, as shown in the derivation of Equation 2.

Figure 2:
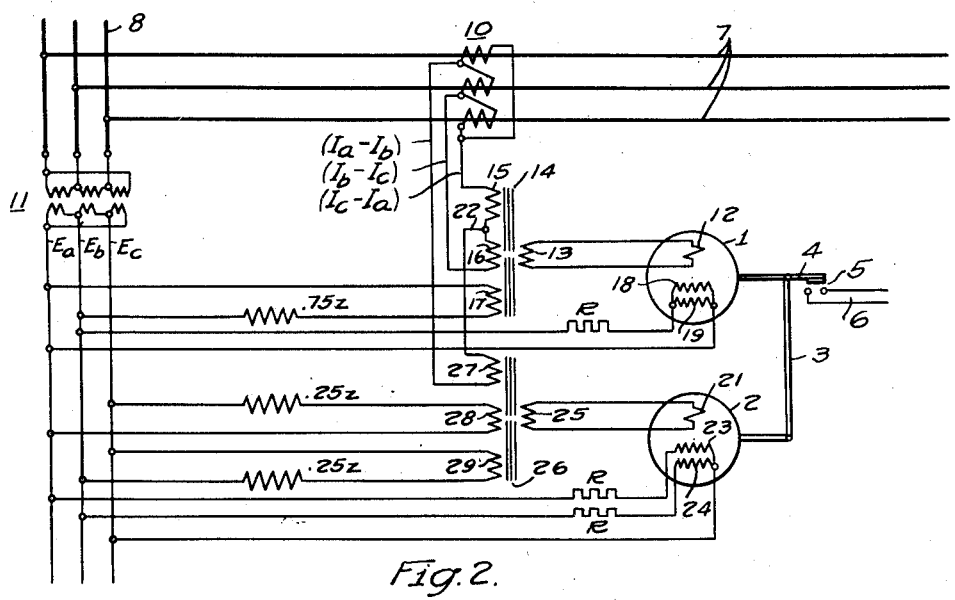

Fig. 2 shows another example of an embodiment of my invention, in which a voltage-restraint which is responsive to the products of all three pairs of the voltage-phases, $$(E_{ab}E_{bc} + E_{bc}E_{ca} + E_{ca}E_{ab})$$

instead of being responsive to only one pair, $E_{ab}E_{bc}$, is added to Equation 4, by way of example, instead of Equation 3 as in Fig. 1.

In Fig. 2, the product-type element 1 has a current-coil 12 which is energized in response to $[(I_c-I_a) - (I_b-I_c) + .75\ ZE_{ab}e^{jz}]$ in accordance with the output of the secondary winding 13 of a mixing-transformer or reactance 14, or by any other suitable means. The mixing-transformer 14 has three primary windings 15, 16 and 17, the first two of which are energized with the differential line-currents $(I_c-I_a)$ and $(I_c-I_b)$, while the third winding is energized with a voltage-responsive current $.75\ ZE_{ab}e^{jz}$ which is obtained from the phases $E_a$ and $E_b$ of the potential-transformers 11, with a serially connected impedance $.75Z$.

The product-type element 1 in Fig. 2 is provided with two voltage-coils 18 and 19 on the same magnetic circuit, so as to provide an excitation $RE_{ab}e^{jr}$, obtained from the phases $E_a$ and $E_b$ of the potential-transformers 11, with a serially connected impedance R.

The second product-type element 2, in Fig. 2, has a current-coil 21 which is energized in response to $[(I_a-I_b) + .25Z(E_{bc}-E_{ca})e^{jz}]$ in accordance with the output of the secondary winding 25 of a mixing-transformer or reactance 26, which has three primary windings 27, 28 and 29. The primary winding 27 is excited with the current $(I_a-I_b)$. The two other primary windings 28 and 29 are energized, respectively, with the voltage-responsive currents $.25ZE_{ac}e^{jz}$ and $.25ZE_{bc}e^{jz}$, obtained from the appropriate phases of the potential-transformers 11, in series with the impedances .25Z, in each case.

The product-type element 2 in Fig. 2 is provided with two voltage-coils 23 and 24, which are wound on the same magnetic circuit to provide an excitation in response to $(RE_{bc}e^{jr} - RE_{ca}e^{jr})$. Thus, the coil 24 is energized from the phases $E_b$ and $E_c$ of the potential-transformers 11, through a serially connected impedance R, and the coil 23 is energized from the phases $E_a$ and $E_c$ of the potential-transformers 11, through a serially connected impedance R.

The resultant torque of the combination shown in Fig. 2 is the real part of the equation, $$T = [(I_c - I_a) - (I_b - I_c) + .75ZE_{ab}e^{jz}].RE_{ab}e^{jr}$$
$$+ [(I_a - I_b) + .25Z(E_{bc} - E_{ca})e^{jz}].R(E_{bc} - E_{ca})e^{jr}$$
$$= 2R(I_a E_{bc} e^{jr} + I_b E_{ca} e^{jr} + I_c E_{ab} e^{jr}) +$$
$$- RZ(E_{ab} E_{bc} e^{j(r-z)} + E_{bc} E_{ca} e^{j(r-z)} + E_{ca} E_{ab} e^{j(r-z)}) \quad (7)$$

In deriving this equation, it has been remembered, from Equation 1, that $$E_{bc} = -E_{ab} - E_{ca}, \text{ whence } .25E_{bc}^2 = -.25E_{ab}E_{bc} - .25E_{bc}E_{ca}$$
$$E_{ca} = -E_{ab} - E_{bc}, \text{ whence } .25E_{ca}^2 = -.25E_{ab}E_{ca} - .25E_{bc}E_{ca} \quad (8)$$
$$E_{ab} = -E_{bc} - E_{ca}, \text{ whence } .75E_{ab}^2 = -.75E_{ab}E_{bc} - .75E_{ab}E_{ca}$$

It will be noted, from Equation 7, that the products of current times voltage, or the directional part of the response, may be considered separate from, and as being superimposed upon, the products of voltage times voltage, or the voltage-responsive restraint, usually called simply voltage-restraint. Thus, Equation 7 may be rewritten, (disregarding phase-shifts), $$T = (2I_c - I_a - I_b).RE_{ab} + (I_a - I_b).R(E_{bc} - E_{ca}) +$$
$$.75ZE_{ab}.RE_{ab} + .25Z(E_{bc} - E_{ca}).R(E_{bc} - E_{ca}) \quad (9)$$

The first two terms of the torque T, as expressed in Equation 9, represent the directional part of the response, which is seen to be in the general form set forth in Equation 4. The last two terms of Equation 9 represent the voltage-restraint, which may be written, $$T_v = .75ZE_{ab}.RE_{ab} + .25Z(E_{bc} - E_{ca}).R(E_{bc} - E_{ca})$$
$$= .25Z(2E_{ab} - E_{bc} - E_{ca}).RE_{ab}$$
$$+ .25Z(E_{bc} - E_{ca}).R(E_{bc} - E_{ca}) \quad (10)$$

which is derived by substituting $E_{ab} = -E_{bc} - E_{ca}$ from Equation 8. The voltage-restraint torque $T_v$ in Equation 10 thus reduces to the same general form set forth in Equation 4.

In like manner, in the directional part of the action, the composite current could be replaced by the substitution, $$(I_c - I_a) - (I_b - I_c) = 2I_c - I_a - I_b = 3I_c - 3I_0 \quad (11)$$

where $I_0$ is the zero-sequence component of the line-currents $I_a$, $I_b$, $I_c$.

The nature of the improvement which is effected by my invention will be appreciated when it is realized that I have produced, with two single-phase product-type elements, the same kind of three-phase voltage-restrained directional-relay response which formerly required six elements, in the previously standard relay of this type, as shown in Fig. 2 of the Goldsborough et al. Patent 2,300,886, granted November 3, 1942, and assigned to the Westinghouse Electric & Manufacturing Company.

My invention is obviously not limited to the illustrated forms of embodiment, and I desire the appended claims to be given the broadest interpretation consistent with their language.

I claim as my invention:

1. A three-phase product-responsive means, comprising two single-phase product-responsive torque-producing parts, a mounting structure for causing said parts to algebraically add their torques, each part comprising two flux-producing means, in a structural arrangement producing a torque which is responsive to the product of the two fluxes, times a predetermined function of the angle between them, the predetermined function being the same for both parts, means for supplying two sets of three-phase electrical quantities, A, B, C, and a, b, c, said quantities having the same frequency and having any phase-angle and any magnitude-ratio between the respective principal phases A and a, at least one of said sets of three-phase quantities, say A, B, C, having no zero-sequence component, means for energizing one flux-producing means of each part in response to a predetermined phase or phases of the three-phase quantity a, b, c, and means for energizing the other flux-producing means of each part in response to a predetermined phase or phases of the three-phase quantity A, B, C, at least some of the energizing-means for the four flux-producing means of the two torque-producing parts producing energization from a plurality of said predetermined phases of its associated three-phase energizing-quantity a, b, c, or A, B, C, as the case may be, the combination of predetermined phases which are chosen for the two flux-producing means of one of said two torque-producing parts being different from the combination of predetermined phases which are chosen for the two flux-producing means of the other of the two torque-producing parts, and said chosen predetermined phase or phases of the two three-phase quantities which are chosen for the energization of the four flux-producing means of the two torque-producing parts being such that the total torque of said two torque-producing parts is selectively responsive to $(aB + bC + cA)$ to the substantial exclusion of the products aA, aC, bA, bB, cB and cC.

2. The invention as specified in claim 1, characterized by A, B and C representing line-voltages, using any voltage-phase as the principal phase A, and a, b and c representing line-currents, using any current-phase as the principal phase a, said line being a three-phase line.

3. The invention as specified in claim 1, characterized by A, B and C representing line-voltages, using any voltage-phase as the principal phase A, and a, b and c representing line-currents, using any current-phase as the principal phase a, said line being a three-phase line, at least one of the current-responsive flux-producing means having also a predetermined vectorial voltage-response to a line-voltage other than the voltage-phase with which it is coupled.

4. The invention as specified in claim 1, characterized by A, B and C representing line-voltages, using any voltage-phase as the principal phase A, and a, b and c representing line-currents, using any current-phase as the principal phase a, said line being a three-phase line, each of the two current-responsive flux-producing means having also such a vectorial line-voltage response that the total torque has a voltage-restraint component which is selectively responsive to $$(AB+BC+CA)$$

5. The invention as specified in claim 1, characterized by A, B and C and $a$, $b$ and $c$ being responsive to the same line-derived three-phase electrical quantity of a three-phase line, the principal phases A and $a$ being any phase or phases of said line-derived three-phase electrical quantity.

6. The invention as specified in claim 1, characterized by A, B and C and $a$, $b$ and $c$ being responsive to the same line-derived three-phase line-voltage of a three-phase line, the principal phases A and $a$ being any phase or phases of said line-derived three-phase line-voltage.

7. A three-phase product-responsive means, comprising two single-phase product-responsive torque-producing parts, a mounting structure for causing said parts to algebraically add their torques, each part comprising two flux-producing means, in a structural arrangement producing a torque which is responsive to the product of the two fluxes, times a predetermined function of the angle between them, the predetermined function being the same for both parts, means for supplying two sets of three-phase electrical quantities, A, B, C, and $a$, $b$, $c$, said quantities having the same frequency and having any phase-angle and any magnitude-ratio between the respective principal phases A and $a$, at least one of said sets of three-phase quantities, say A, B, C, having no zero-sequence component, means for energizing one flux-producing means of the first part with a flux which is predeterminedly responsive to a quantity equivalent to $(b-a)$, means for energizing one flux-producing means of the second part with a flux which is similarly responsive to a quantity equivalent to $(c-a)$, means for energizing the other flux-producing means of the first part with a flux which is predeterminedly responsive to a quantity equivalent to C, and means for energizing the other flux-producing means of the first part with a flux which is similarly responsive to a quantity equivalent to A.

8. The invention as specified in claim 7, characterized by A, B and C representing line-voltages, using any voltage-phase as the principal phase A, and $a$, $b$ and $c$ representing line-currents, using any current-phase as the principal phase $a$, said line being a three-phase line.

9. The invention as specified in claim 7, characterized by A, B and C representing line-voltages, using any voltage-phase as the principal phase A, and $a$, $b$ and $c$ representing line-currents, using any current-phase as the principal phase $a$, said line being a three-phase line, at least one of the current-responsive flux-producing means having also a predetermined vectorial voltage-response to a line-voltage other than the voltage-phase with which it is coupled.

10. The invention as specified in claim 7, characterized by A, B and C representing line-voltages, using any voltage-phase as the principal phase A, and $a$, $b$ and $c$ representing line-currents, using any current-phase as the principal phase $a$, said line being a three-phase line, each of the two current-responsive flux-producing means having also such a vectorial line-voltage response that the total torque has a voltage-restraint component responsive to $(AB+BC+CA)$.

11. The invention as specified in claim 7, characterized by A, B and C and $a$, $b$ and $c$ being responsive to the same line-derived three-phase electrical quantity of a three-phase line, the principal phases A and $a$ being any phase or phases of said line-derived three-phase electrical quantity.

12. The invention as specified in claim 7, characterized by A, B and C and $a$, $b$ and $c$ being responsive to the same line-derived three-phase line-voltage of a three-phase line, the principal phases A and $a$ being any phase or phases of said line-derived three-phase line-voltage.

13. A three-phase product-responsive means, comprising two single-phase product-responsive torque-producing parts, a mounting structure for causing said parts to algebraically add their torques, each part comprising two flux-producing means, in a structural arrangement producing a torque which is responsive to the product of the two fluxes, times a predetermined function of the angle between them, the predetermined function being the same for both parts, means for supplying two sets of three-phase electrical quantities, A, B, C, and $a$, $b$, $c$, said quantities having the same frequency and having any phase-angle and any magnitude-ratio between the respective principal phases A and $a$, at least one of said sets of three-phase quantities, say A, B, C, having no zero-sequence component, means for energizing one flux-producing means of the first part with a flux which is predeterminedly responsive to a quantity equivalent to $(a-b)$, means for energizing one flux-producing means of the second part with a flux which is similarly responsive to a quantity equivalent to $(2c-a-b)$, means for energizing the other flux-producing means of the first part with a flux which is predeterminedly responsive to a quantity equivalent to $(B-C)$, and means for energizing the other flux-producing means of the first part with a flux which is similarly responsive to a quantity equivalent to A.

14. The invention as specified in claim 13, characterized by A, B and C representing line-voltages, using any voltage-phase as the principal phase A, and $a$ $b$ and $c$ representing line-currents, using any current-phase as the principal phase $a$, said line being a three-phase line.

15. The invention as specified in claim 13, characterized by A, B and C representing line-voltages, using any voltage-phase as the principal phase A, and $a$, $b$ and $c$ representing line-currents, using any current-phase as the principal phase $a$, said line being a three-phase line, at least one of the current-responsive flux-producing means having also a predetermined vectorial voltage-response to a line-voltage other than the voltage-phase with which it is coupled.

16. The invention as specified in claim 13, characterized by A, B and C representing line-voltages, using any voltage-phase as the principal phase A, and $a$, $b$ and $c$ representing line-currents, using any current-phase as the principal phase $a$, said line being a three-phase line, the current-responsive flux-producing means which is responsive to a quantity equivalent to $(2c-a-b)$ having also a predetermined vectorial voltage-response to three times the line-voltage A, and the current-responsive flux-producing means which is responsive to a quantity equivalent to $(a-b)$ having also a similar vectorial voltage-response to the differential line-voltage $(B-C)$.

17. The invention as specified in claim 13, characterized by A, B and C and $a$, $b$ and $c$ being responsive to the same line-derived three-phase electrical quantity of a three-phase line, the principal phases A and $a$ being any phase or phases of said line-derived three-phase electrical quantity.

18. The invention as specified in claim 13, characterized by A, B and C and $a$, $b$ and $c$ being responsive to the same line-derived three-phase line-voltage of a three-phase line, the principal phases A and $a$ being any phase or phases of said line-derived three-phase line voltage.

ARTHUR C. MEHRING.

REFERENCES CITED

The following references are of record in the file of this patent:

UNITED STATES PATENTS

| Number | Name | Date |
|---|---|---|
| 2,110,676 | Prince | Mar. 8, 1938 |
| 2,300,886 | Goldsborough et al. | Nov. 3, 1942 |
| 2,301,162 | Hoard | Nov. 3, 1942 |
| 2,380,187 | Mehring | July 10, 1945 |